United States Patent
Cao et al.

(10) Patent No.: US 10,021,324 B2
(45) Date of Patent: Jul. 10, 2018

(54) METHOD AND SYSTEM OF CORRECTING DEFECTIVE PIXELS

(71) Applicant: SZ DJI TECHNOLOGY CO., LTD., Shenzhen (CN)

(72) Inventors: Zisheng Cao, Shenzhen (CN); Caigao Jiang, Shenzhen (CN); Xiaozheng Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/125,021

(22) PCT Filed: Mar. 12, 2014

(86) PCT No.: PCT/CN2014/073314
§ 371 (c)(1),
(2) Date: Sep. 9, 2016

(87) PCT Pub. No.: WO2015/135164
PCT Pub. Date: Sep. 17, 2015

(65) Prior Publication Data
US 2017/0026597 A1    Jan. 26, 2017

(51) Int. Cl.
*H04N 5/367*    (2011.01)
*H04N 9/04*    (2006.01)

(52) U.S. Cl.
CPC ............ *H04N 5/367* (2013.01); *H04N 9/045* (2013.01)

(58) Field of Classification Search
CPC ............................ H04N 5/367; H04N 5/3532
See application file for complete search history.

(56) References Cited

U.S. PATENT DOCUMENTS

| | | | | |
|---|---|---|---|---|
| 6,529,618 | B1* | 3/2003 | Ohara | .................. G06T 11/005 382/132 |
| 9,628,650 | B2* | 4/2017 | Nakamura | ......... H04N 1/00803 |
| 2001/0041018 | A1* | 11/2001 | Sonoda | .................. G06T 5/004 382/275 |

(Continued)

FOREIGN PATENT DOCUMENTS

| CN | 101296327 A | 10/2008 |
|---|---|---|
| CN | 102045513 | 5/2011 |

(Continued)

OTHER PUBLICATIONS

International Search Report dated Jul. 14, 2014, in corresponding International Application No. PCT/CN2014/073314 issued by the State Intellectual Property Office of the P.R. China: 6 pages.

*Primary Examiner* — Cynthia Segura
(74) *Attorney, Agent, or Firm* — Finnegan, Henderson, Farabow, Garrett & Dunner, L.L.P.

(57) ABSTRACT

Provided is a method of correcting a defective pixel of a digital image. In the method, the defective pixels are pre-corrected. The similarities of normal pixels and each defective pixel are calculated. The weight of each normal pixel to each defective pixel is calculated based on the similarities of the normal pixels and each defective pixel. The weight of each normal pixel to each defective pixel is normalized. The normalized weighted values of the normal pixels to each defective pixel are weighted summed to obtain the corrected pixel value of each defective pixel.

6 Claims, 6 Drawing Sheets

(56) References Cited

U.S. PATENT DOCUMENTS

| | | | |
|---|---|---|---|
| 2004/0263648 A1* | 12/2004 | Mouli | H04N 5/335 348/243 |
| 2005/0047658 A1* | 3/2005 | Kita | H04N 1/4097 382/167 |
| 2008/0012967 A1* | 1/2008 | Kuwabara | H04N 5/32 348/246 |
| 2008/0231734 A1* | 9/2008 | Enomoto | H04N 1/401 348/246 |
| 2009/0040343 A1* | 2/2009 | Kao | H04N 9/045 348/246 |
| 2009/0214129 A1* | 8/2009 | Quan | G06T 3/4015 382/260 |
| 2009/0252397 A1* | 10/2009 | Kuwabara | G06T 5/005 382/132 |
| 2011/0013053 A1* | 1/2011 | Chen | H04N 5/367 348/246 |
| 2012/0019693 A1 | 1/2012 | Goma et al. | |
| 2012/0281123 A1* | 11/2012 | Hoda | H04N 5/3675 348/246 |
| 2013/0258145 A1* | 10/2013 | Nakaseko | H04N 5/357 348/246 |
| 2015/0070536 A1* | 3/2015 | Sasaki | H04N 5/367 348/246 |
| 2016/0191738 A1* | 6/2016 | Nakamura | H04N 1/00803 358/1.12 |

FOREIGN PATENT DOCUMENTS

| | | | |
|---|---|---|---|
| CN | 102197641 A | 9/2011 | |
| CN | 102572318 | 7/2012 | |
| CN | 102640489 A | 8/2012 | |
| CN | 103024302 | 4/2013 | |
| CN | 103035185 | 4/2013 | |
| EP | 1511295 A2 * | 3/2005 | H04N 1/4097 |
| WO | WO 2012/116862 A1 | 9/2012 | |

* cited by examiner

| R11 | R12 | R13 |
|---|---|---|
| R21 | R22 | R23 |
| R31 | R32 | R33 |

| W11 | W12 | W13 |
|---|---|---|
| W21 | 0 | W23 |
| W31 | W32 | W33 |

METHOD AND SYSTEM OF CORRECTING DEFECTIVE PIXELS

CROSS REFERENCE TO RELATED APPLICATIONS

This application is a national phase application of International Application No. PCT/CN2014/073314, filed Mar. 12, 2014, the content of which is incorporated herein by reference in its entirety.

FIELD

The subject matter herein generally relates to image process technologies, and particularly to a method and a system of correcting defective pixels of a digital image.

BACKGROUND

Digital cameras generally adapt a Charge-Coupled Device (CCD) or Complementary Metal Oxide Semiconductor (CMOS) as a sensor. These sensors may have some defective pixels, including bright pixels and dark pixels, attributed to production issues. These defective pixels are pixels having an abnormal photosensitivity, and are not controllable by the photosensitive system. The dark pixels cannot sense lights, and the bright pixels always output high intensity values. If the pixel values of these defective pixels are not compensated for, image quality would be affected by pixels that should not have existed in the captured scene in the photo. In testing the digital cameras at the factory or self-testing, the coordinates of these defective pixels are measured and recorded, and are stored in a Random Access Memory (RAM) or Read Only Memory (ROM) for storing defect correction data. In actual shooting of images, the digital camera will correct the pixel value of the defective pixel in real time to compensate for the defective pixel, usually by calculating a corrected pixel value of the defective pixel based on the pixel values of pixels in the neighborhood of the defective pixel.

Since neighboring pixels generally have similar pixel values to the defective pixel, an average pixel value of the pixels surrounding the defective pixel is generally used as the corrected pixel value of the defective pixel. Referring to FIG. 1, a typical RGB Bayer sensor uses an average pixel value of the neighboring pixels of the defective pixel in a given color channel as the corrected pixel value of the defective pixel. Take R channel as an example. The position of a defective pixel $R_{22}$ has been marked, and an average pixel value of eight pixels nearest to the defective pixel $R_{22}$ is calculated as the corrected pixel value $\hat{R}_{22}$:

$$\hat{R}_{22} = \frac{1}{8} \sum_{\substack{i=1,2,3 \\ j=1,2,3 \\ (i,j) \neq (2,2)}} R_{i,j}.$$

When the signal-to-noise ratio (SNR) is relatively low, the area of the neighborhood can be enlarged appropriately to obtain a higher gain from binning. However, if the imaging information of the defective pixel corresponds to an edge of the digital image, detail information of the digital image may be lost. Referring to FIG. 2, the R channel is considered. $R_{22}$ corresponds to the position of a defective pixel, $R_{13}$, $R_{22}$, and $R_{31}$ correspond to details at the edge of the digital image (color A), and the remaining pixels correspond to color B. Because the number of the pixels corresponding to the color B is greater than the number of the pixels corresponding to the color A, the corrected pixel value $\hat{R}_{22}$ of the defective pixel $R_{22}$ will have the color B to result in a visual discontinuity at the edge. Thus, the neighboring pixels should be weighted differently to result in the corrected pixel value of the defective pixel.

In sum, there is a flaw in the existing averaging method because the method does not effectively distinguish the neighboring pixels of the defective pixel. It is proposed that an improved method of correcting the defective pixel is needed to fully consider the different influences of the pixels in the neighborhood on the defective pixel.

SUMMARY

The present disclosure provides a method and a system of correcting a defective pixel which fully consider different influences of the pixels in the neighborhood on correction of the defective pixel, such that the corrected pixel value of the defective pixel is better obtained such that it is closer to the original information, and the defective pixel is more accurately corrected.

The technical solutions of the embodiments of the present disclosure are implemented as follows.

Embodiments of the present disclosure provide a method of correcting a defective pixel of a digital image. The method includes:

pre-correcting the defective pixel;
calculating similarities between a plurality of normal pixels and the defective pixel;
calculating weights of the plurality of normal pixels to the defective pixel based on the similarities between the plurality of normal pixels and the defective pixel; and
normalizing the weights and adopting a weighted sum of values of the normal pixels according to the normalized weights as a corrected value of the defective pixel.

In an embodiment, the normal pixels are random normal pixels in the digital image or are normal pixels in a neighborhood centered on the defective pixel.

Calculating similarities between the plurality of normal pixels and the defective pixel comprises calculating the similarities between the normal pixels and the defective pixel based on a neighborhood similarity as follows:

$$D(P_i, P_j) = \|U_R(P_i) - U_R(P_j)\|,$$

where $P_i$ is a defective pixel, $P_j$ is a normal pixel neighboring the defective pixel $P_i$; and $D(P_i, P_j)$ is a distance representing a similarity between the pixels $P_i$ and $P_j$, where the greater the distance is, the lower the similarity becomes, and the lower the weight becomes; and $U_R(P_i)$ represents a neighborhood of the defective pixel $P_i$, which is a matrix having a size of 2R+1 centered on the defective pixel $P_i$.

Calculating weights of the plurality of normal pixels to the defective pixel based on the similarities between the plurality of normal pixels and the defective pixel comprises calculating a weight $W_{i,j}$ of the normal pixel to the defective pixel by the equation:

$$W_{i,j} = e^{-\frac{D^2(P_i, P_j)}{\sigma^2}}, \text{ or } W_{i,j} = -\frac{\sigma}{1 + D(P_i, P_j)},$$

where σ is a constant, and $D(P_i, P_j)$ represents the similarity of the normal pixel to the defective pixel.

Normalizing the weights and adopting a weighted sum of values of the normal pixels according to the normalized weights as a corrected value of the defective pixel comprises calculating a corrected value $\hat{P}_i$ of the defective pixel by the equation:

$$\hat{P}_i = \Sigma_j W^*_{i,j} P_j$$

where $W^*_{i,j}$ represents the normalized weight of the normal pixel $P_j$ to the defective pixel $P_i$ and is calculated by the equation:

$$W^*_{i,j} = \frac{W_{i,j}}{\Sigma_j W_{i,j}}.$$

Embodiments of the present disclosure provide a system of correcting a defective pixel of a digital image, the system includes:

a pre-correcting unit configured to pre-correct the defective pixel;

a similarity calculation unit in communication with the pre-correcting unit and configured to calculate similarities between a plurality of normal pixels and the defective pixel;

a weight calculation unit in communication with the similarity calculation unit and configured to calculate weights of the plurality of normal pixels to the defective pixel based on the similarities between the plurality of normal pixels and the defective pixel; and a correcting unit in communication with the weight calculation unit and configured to normalize the weights and adopt a weighted sum of values of the normal pixels according to the normalized weights as a corrected value for the defective pixel.

The normal pixels are random normal pixels in the digital image or are normal pixels in a neighborhood centered on the defective pixel.

The similarity calculation unit is configured to calculate the similarities between the normal pixel and the defective pixel based on a neighborhood similarity by the equation:

$$D(P_i, P_j) = \|U_R(P_i) - U_R(P_j)\|,$$

where $P_i$ is a defective pixel; $P_j$ represents a normal pixel neighboring the defective pixel $P_i$; and $D(P_i, P_j)$ is a distance representing a similarity between the pixels $P_i$ and $P_j$, where the greater the distance is, the lower the similarity becomes, and the lower the weight becomes; and $U_R(P_i)$ represents a neighborhood of the defective pixel $P_i$, which is a matrix having a size of 2R+1 centered on the defective pixel $P_i$.

The weight calculation unit is configured to calculate a weight $W_{i,j}$ of the normal pixel to the defective pixel by the equation:

$$W_{i,j} = e^{-\frac{D^2(P_i, P_j)}{\sigma^2}}, \text{ or } W_{i,j} = -\frac{\sigma}{1 + D(P_i, P_j)},$$

where σ is a constant, and $D(P_i, P_j)$ represents the similarity of the normal pixel to the defective pixel.

The correcting unit is configured to calculate a corrected value $\hat{P}_i$ of the defective pixel by the equation:

$$\hat{P}_i = \Sigma_j W^*_{i,j} P_j$$

where $W^*_{i,j}$ represents the normalized weight of the normal pixel $P_j$ to the defective pixel $P_i$ and is calculated by the equation:

$$W^*_{i,j} = \frac{W_{i,j}}{\Sigma_j W_{i,j}}.$$

The embodiments above have the following advantages. Similarities between a plurality of normal pixels and the defective pixel are calculated. Weights of the plurality of normal pixels to the defective pixel based on the similarities between the plurality of normal pixels and the defective pixel are calculated. The weights are normalized, and a weighted sum of values of the normal pixels according to the normalized weights is adopted as a corrected value of the defective pixel. Thus, different influences of the pixels in the neighborhood on correction of the defective pixel can be fully considered so that a normal pixel more similar to shooting information of the defective pixel has a greater weight. As such, the corrected pixel value of the defective pixel is better obtained such that it is closer to the original information, and the defective pixel is more accurately corrected.

BRIEF DESCRIPTION OF THE DRAWINGS

Implementations of the present technology will now be described, by way of example only, with reference to the attached figures, wherein:

FIG. 4 is a diagram illustrating a simplified method of correcting defective pixels according to an embodiment of the present disclosure;

DETAILED DESCRIPTION

Figure 1:
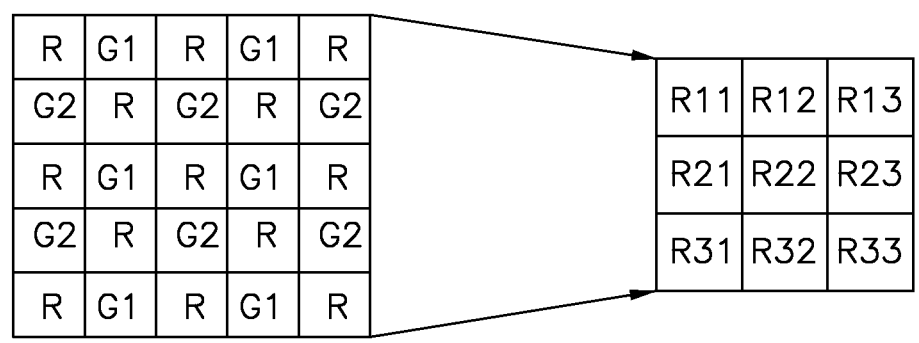
FIG. 1 is a diagram illustrating a conventional method of correcting defective pixels.
Figure 2:
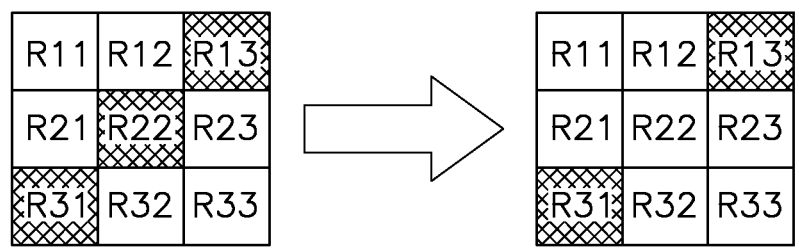
FIG. 2 is a diagram illustrating the correction of pixels by the conventional method of FIG. 1.
Figure 3:
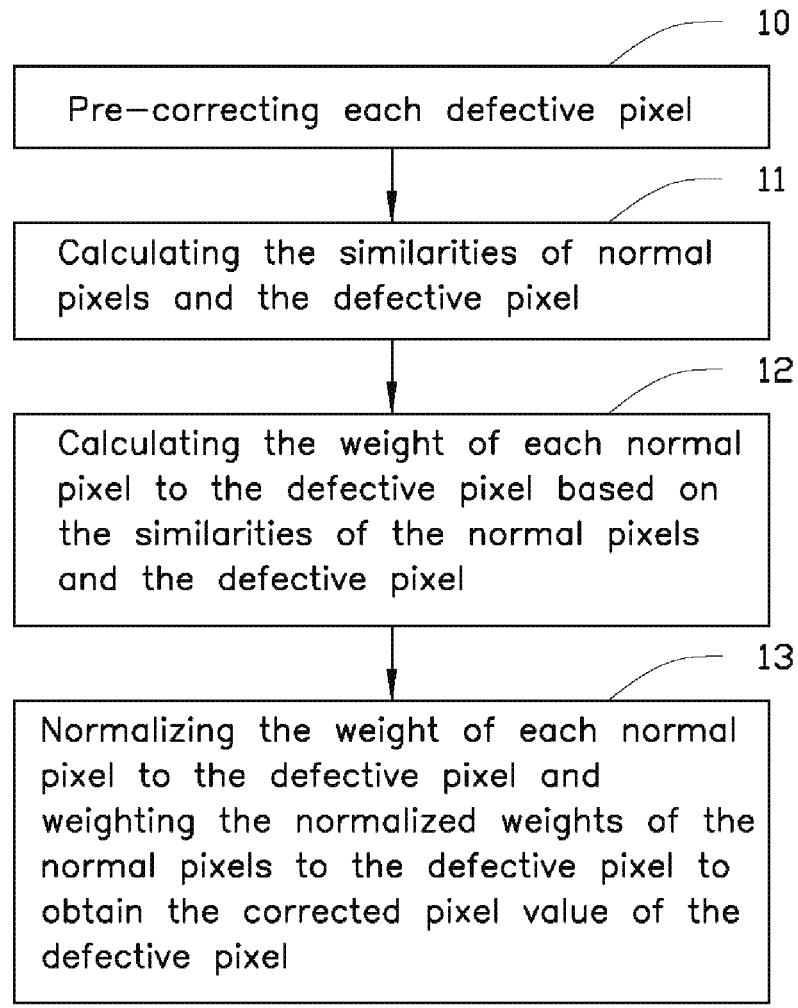
FIG. 3 is a flowchart illustrating a method of correcting defective pixels according to an embodiment of the present disclosure.

Referring to FIG. 3, a flowchart illustrating a method of correcting defective pixels according to an embodiment of the present disclosure. The method includes the following steps:

In step S10, each defective pixel is pre-corrected.

If there are other defective pixels neighboring a specific defective pixel, the pixel value of the specific defective pixel cannot be corrected. Therefore, each defective pixel is first pre-corrected. In step S10, a set of pixels representing positions of defective pixels ascertained at the factory or by the user is defined as $C_p$: $\{P_1, P_2, \ldots, P_I\}$. The set of pixels $C_p$ is traversed. That is, for each defective pixel $P_i$, $1 \leq i \leq I$, in $C_p$, a pre-corrected pixel value is adopted as the pixel value of each defective pixel $P_i$ by pre-correcting set $C_p$ using the conventional averaging method. It is understood that, in other embodiments, a defective pixel can also be pre-corrected using a nearest neighbor method, i.e., using a pixel value of the surrounding normal pixels as the pixel value of the defective pixel.

In step S11, similarities of a plurality of normal pixels to each defective pixel are calculated.

The plurality of normal pixels can be random normal pixels in the digital image, or they can be the normal pixels in a neighborhood centered on the defective pixel. Specifically, a set of normal pixels is defined as C: $\{P_1, P_2, \ldots, P_J\}$ consisting of pixels that are all normal pixels. Set C can include all normal pixels in the digital image or can consist of a pixel neighborhood surrounding the defective pixel $P_i$.

In step S11, the whole digital image is traversed. That is, all normal pixels in the digital image are taken as the normal pixels. For each normal pixel $P_j$, $1 \leq i \leq J$, the similarity of each normal pixel $P_j$ to a defective pixel $P_i$ is calculated based on a neighborhood similarity as follows:

$$D(P_i, P_j) = \|U_R(P_i) - U_R(P_j)\| \quad (1).$$

Where $P_i$ is a defective pixel; $P_j$ represents a normal pixel neighboring the defective pixel $P_i$; a distance $D(P_i, P_j)$ represents the similarity between the normal pixel $P_j$ and the defective pixel $P_i$, where the greater the distance $D(P_i, P_j)$ is, the lower the similarity between the normal pixel $P_j$ and the defective pixel $P_i$ is, and hence the lower the weight of the normal pixel $P_j$ to the defective pixel $P_i$ is; $U_R(P_i)$ represents a neighborhood of the defective pixel $P_i$, i.e., the defective pixel $P_i$ is the center of a matrix having a size of $2R+1$, where R is a positive integer In the embodiment of the present disclosure, in equation (1) above, the similarity between two pixels is determined by their neighborhood similarity. Therefore, equation (1) can also be used to measure the similarity between a normal pixel $P_j$ and another normal pixel. Equation (1) can use any norm. In one embodiment, equation (1) generally uses the Euclidean distance, $L^2$ norm.

In step S12, the weight of each normal pixel to the defective pixel is calculated based on the similarity of each normal pixel to the defective pixel.

The weight and the distance are inversely related, and many functions can be used to describe the relationship between the weight and the distance. In one embodiment of the present disclosure, the weight $W_{i,j}$ of a normal pixel $P_j$ to a defective pixel $P_i$ is calculated as follows:

$$W_{i,j} = e^{-\frac{D^2(P_i, P_j)}{\sigma^2}}, \text{ or} \quad (2)$$

$$W_{i,j} = -\frac{\sigma}{1 + D(P_i, P_j)}. \quad (3)$$

Where $\sigma$ is a constant and $D(P_i, P_j)$ represents the similarity of the normal pixel Pj to the defective pixel $P_i$. Obviously, equation (3) has less calculation amount than equation (2). In other embodiments of the present disclosure, other functions can be used to calculate the weight of the normal pixel $P_j$ to the defective pixel $P_i$.

In step S13, the weight of each normal pixel to the defective pixel is normalized, and a weighted sum of the normalized weighted values of the normal pixels is adopted as the corrected pixel value of the defective pixel.

The corrected pixel value $\hat{P}_i$ of the defective pixel $P_i$ is calculated by the following equations:

$$\hat{P}_i = \Sigma_j W_{i,j}^* P_j, \text{ where} \quad (4)$$

$$W_{i,j}^* = \frac{W_{i,j}}{\Sigma_j W_{i,j}}. \quad (5)$$

Where $W^*_{i,j}$ represents the normalized weight, and $W_{i,j}$ represents the weight of the normal pixel $P_j$ to the defective pixel $P_i$. In calculating the corrected pixel value of the defective pixel, different influences of the pixels in the neighborhood on correction of the defective pixel have been fully considered so that a normal pixel more similar to shooting information of the defective pixel has a greater weight. As such, the corrected pixel value of the defective pixel is better obtained such that it is closer to the original information, and the defective pixel is more accurately corrected.

When the set of pixels C includes more normal pixels, i.e., when the neighborhood centered on the defective pixel $P_i$ becomes larger, the calculation of the corrected pixel value of the defective pixel $P_i$ becomes more complicated. In one embodiment of the present disclosure, a simplified method of correcting defective pixels is provided. The simplified method is suitable to be performed by Field Programmable Gate Array circuits while still retaining the general nature of the approach. Referring to FIG. 4, for example, in channel R, a set of pixels representing positions of defective pixels ascertained at the factory or by the user is defined as $C_p$: $\{P_1, P_2, \ldots, P_I\}$, assuming that the neighborhood has a half size of R, where R is a positive integer. A 3×3 neighborhood is used, i.e., the corrected pixel value of the defective pixel $\hat{R}_{22}$ is obtained by calculation based on the weighted values of eight normal pixels that are nearest to the defective pixel. The conventional averaging method for correction can be regarded as an exception to this weighted method. Set C is now degraded as: $\{R_{11}, R_{12}, R_{13}, R_{21}, R_{23}, R_{31}, R_{32}, R_{33}\}$. First, set $C_p$ is traversed to have each defective pixel $P_i$ in set C pre-corrected using the conventional averaging method, and the pre-corrected pixel value is adopted as the pixel value of the defective pixel. Next, for each defective pixel $P_i$, $1 \leq i \leq I$, in set C, a neighborhood $(2R+1) \times (2R+1)$ centered on the defective pixel is traversed. Here, for each normal pixel $P_j$, $1 \leq i \leq J$, in the neighborhood, the distance $D(P_i, P_j)$ between each normal pixel $P_j$ and the defective pixel $P_i$ is calculated using equation (1), and the weight $W_{i,j}$ of each normal pixel $P_j$ to the defective pixel $P_i$ is calculated using equation (2) or equation (3). Finally, the weight is normalized using equation (5), and a weighted sum of the normalized weighted values of the normal pixels $P_j$ is adopted as the corrected pixel value of the defective pixel using equation (4).

In embodiments of the present disclosure, the simplified method described above uses a 3×3 pixel neighborhood for simulation under different SNR conditions. White Gaussian noise of different SNRs are added to a standard test picture (512×512), and one thousand defective pixels are randomly placed in the standard test picture without repetition of the pixel positions. The values of the normal pixels having positions corresponding to the set of the defective pixels placed are represented as S: $\{P_1, P_2, \ldots, P_J\}$. The corrected pixel values that are calculated using the conventional averaging method using a 3×3 neighborhood are represented as $\hat{S}_1$: $\{\hat{P}_1^{(1)}, \hat{P}_2^{(1)}, \ldots, \hat{P}_I^{(1)}\}$. The normal pixel values that are calculated using the simplified method of the present disclosure (using a 3×3 neighborhood, with σ=1) are represented as $\hat{S}_2$: $\{\hat{P}_1^{(2)}, \hat{P}_2^{(2)}, \ldots, \hat{P}_I^{(2)}\}$. The corrected SNRs are calculated as follows:

$$SNR1 = 20\ \log\left(\frac{std(P)}{std(|P - P^{(1)}|)}\right) \text{ and } SNR2 = 20\ \log\left(\frac{std(P)}{std(|P - P^{(2)}|)}\right).$$

Figure 5:
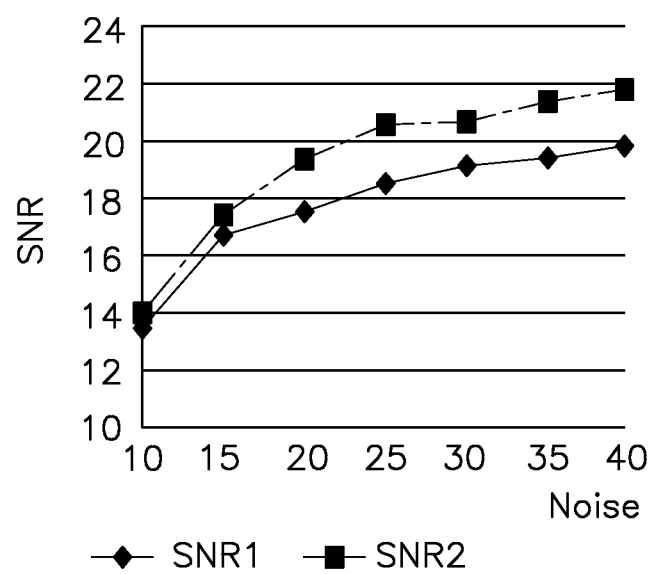
FIG. 5 shows a graph illustrating testing results of the conventional method of FIG. 1 and the simplified method of FIG. 4.

FIG. 5 shows a graph of the corrected SNRs under different noise conditions. It is observed that the SNR of the simplified method in the present disclosure has about 0.5 dB gain under a low SNR condition, about 2 dB gain under a high SNR condition. In other words, the corrected value of the defective pixel obtained using the method of the present disclosure is closer to the original information.

In an embodiment of the present disclosure, a defective pixel is pre-corrected using a conventional averaging method. Similarities between a plurality of normal pixels and the defective pixel are calculated. Weights of the plurality of normal pixels to the defective pixel based on the similarities between the plurality of normal pixels and the defective pixel are calculated. The weights are normalized, and a weighted sum of values of the normal pixels according to the normalized weights is adopted as a corrected value of the defective pixel. Thus, different influences of the pixels in the neighborhood on correction of the defective pixel can be fully considered so that a normal pixel more similar to shooting information of the defective pixel has a greater weight. As such, the corrected pixel value of the defective pixel is better obtained such that it is closer to the original information, and the defective pixel is more accurately corrected.

Figure 6:
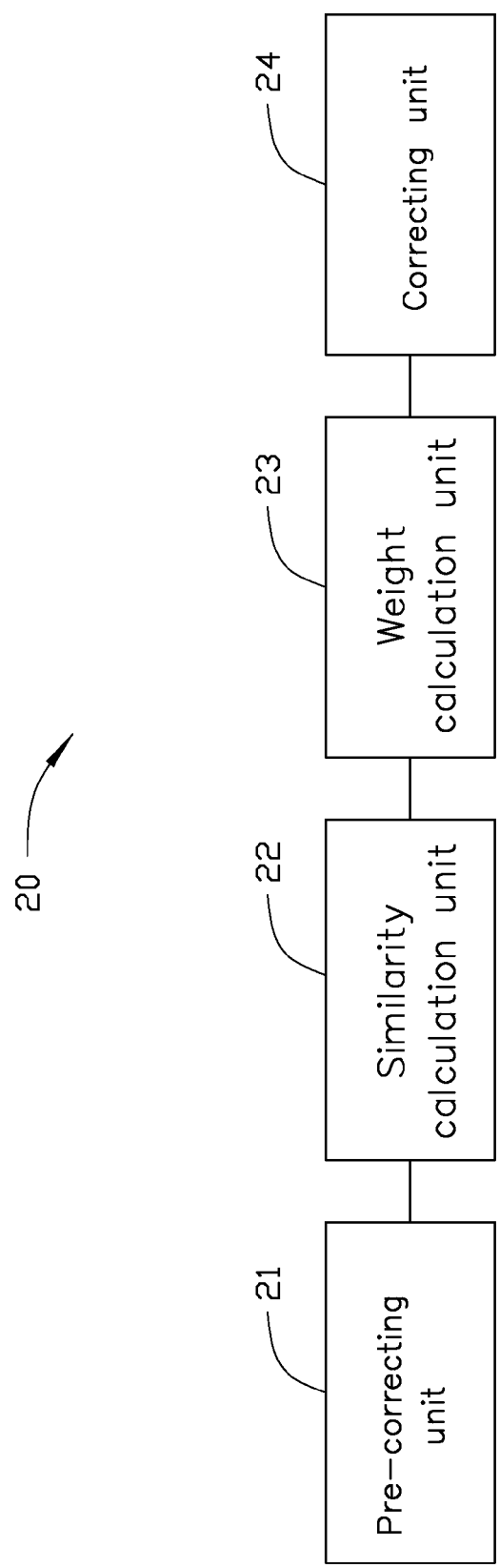
FIG. 6 is a block diagram illustrating a system of correcting defective pixels according to an embodiment of the present disclosure.

Referring to FIG. 6, which is a block diagram illustrating a system of correcting defective pixels according to an embodiment of the present disclosure, a system 20 of correcting defective pixels includes a pre-correcting unit 21, a similarity calculation unit 22, a weight calculation unit 23, and a correcting unit 24. The pre-correcting unit 21 pre-corrects each defective pixel using the conventional averaging method.

The similarity calculation unit 22 is in communication with the pre-correcting unit 21 and is configured to calculate similarities between a plurality of normal pixels and the defective pixel. The weight calculation unit 23 is in communication with the similarity calculation unit 22 and is configured to calculate weights of the plurality of normal pixels to the defective pixel based on the similarities between the plurality of normal pixels and the defective pixel. The correcting unit 24 is in communication with the weight calculation unit 23 and is configured to normalize the weights and adopt a weighted sum of values of the normal pixels according to the normalized weights as a corrected value of the defective pixel.

In the embodiment of the present disclosure, a set of pixels representing positions of defective pixels ascertained at the factory or by the user is defined as $C_p$: $\{P_1, P_2, \ldots, P_I\}$. The set of pixels $C_p$ is traversed. That is, for each defective pixel $P_i$, $1 \leq i \leq I$, in $C_p$, a pre-corrected pixel value is adopted as the pixel value of each defective pixel $P_i$ by pre-correcting set $C_p$ using the conventional averaging method. This will ensure proper process of correcting the defective pixels.

In the embodiment of the present disclosure, the plurality of normal pixels can be random normal pixels in the digital image, or they can be the normal pixels in a neighborhood centered on the defective pixel. Specifically, a set of normal pixels is defined as C: $\{P_1, P_2, \ldots, P_J\}$ consisting of pixels that are all normal pixels. Set C can include all normal pixels in the digital image or can consist of a pixel neighborhood surrounding the defective pixel $P_i$.

In the embodiment of the present disclosure, the similarity calculation unit 22 traverses the whole digital image. That is, all normal pixels in the digital image are taken as the normal pixels. For each normal pixel $P_j$, $1 \leq i \leq J$, the similarity of each normal pixel $P_j$ to a defective pixel $P_i$ is calculated based on a neighborhood similarity as follows:

$$D(P_i, P_j) = \|U_R(P_i) - U_R(P_j)\|.$$

Where $P_i$ is a defective pixel; $P_j$ represents a normal pixel neighboring the defective pixel $P_i$; a distance $D(P_i, P_j)$ represents the similarity between the normal pixel $P_j$ and the defective pixel $P_i$, where the greater the distance $D(P_i, P_j)$ is, the lower the similarity between the normal pixel $P_j$ and the defective pixel $P_i$ is, and hence the lower the weight of the normal pixel $P_j$ to the defective pixel $P_i$ is; $U_R(P_i)$ represents a neighborhood of the defective pixel $P_i$, i.e., the defective pixel $P_i$ is the center of a matrix having a size of 2R+1, where R is a positive integer.

The equation above can use any norm, and can generally use the Euclidean distance, $L^2$ norm. The equation above can also be used to measure the similarity between a normal pixel $P_j$ and another normal pixel. In actual calculation, the center pixel can be left out from the calculation to effectively enhance the measuring performance.

In the embodiment of the present disclosure, the weight calculation unit 23 calculates, for each normal pixel $P_j$, the weight $W_{i,j}$ of the normal pixel $P_j$ to a defective pixel $P_i$ as follows:

$$W_{i,j} = e^{-\frac{D^2(P_i, P_j)}{\sigma^2}}, \text{ or } W_{i,j} = -\frac{\sigma}{1 + D(P_i, P_j)}.$$

Wherein σ is a constant and $D(P_i, P_j)$ represents the similarity of the normal pixel Pj to the defective pixel $P_i$. Obviously, in other embodiments of the present disclosure, other functions can be used to calculate the weight of the normal pixel $P_j$ to the defective pixel $P_i$.

The correcting unit 24 calculates the corrected pixel value $\hat{P}_i$ of the defective pixel $P_i$ as follows:

$$\hat{P}_i = \Sigma_j W^*_{i,j} P_j \text{ and } W^*_{i,j} = \frac{W_{i,j}}{\Sigma_j W_{i,j}}.$$

Where $W^*_{i,j}$ represents the normalized weight, and $W_{i,j}$ represents the weight of the normal pixel $P_j$ to the defective pixel $P_i$. In calculating the corrected pixel value of the defective pixel, different influences of the pixels in the neighborhood on correction of the defective pixel have been fully considered so that a normal pixel more similar to shooting information of the defective pixel has a greater weight. As such, the corrected pixel value of the defective pixel is better obtained such that it is closer to the original information, and the defective pixel is more accurately corrected.

In the embodiment of the present disclosure, a system configure to operate on a simplified method of correcting defective pixels is provided. Take channel R as an example, a set of pixels representing positions of defective pixels ascertained at the factory or by the user is defined as $C_p$: $\{P_1, P_2, \ldots, P_I\}$, assuming that the neighborhood has a half size of R, where R is a positive integer. A 3×3 neighborhood is used, i.e., the corrected pixel value of the defective pixel $\hat{R}_{22}$ is obtained by calculation based on the weighted values of eight normal pixels that are nearest to the defective pixel. First, set $C_p$ is traversed to have each defective pixel $P_i$ in set C pre-corrected using the conventional averaging method, and the pre-corrected pixel value is adopted as the pixel value of the defective pixel. Next, for each defective pixel $P_i$, $1 \le i \le I$, in set C, a neighborhood $(2R+1) \times (2R+1)$ centered on the defective pixel is traversed. For each normal pixel $P_j$, $1 \le i \le J$, in the neighborhood, the distance $D(P_i, P_j)$ between each normal pixel $P_j$ and the defective pixel $P_i$ and the weight $W_{i,j}$ of the normal pixel $P_j$ to the defective pixel $P_i$ are calculated using the corresponding equations above. Finally, the weight is normalized, and a weighted sum of the normalized weighted values of the normal pixels is adopted as the corrected pixel value of the defective pixel.

In the embodiment of the present disclosure, the pre-correcting unit 21 pre-corrects each defective pixel using the conventional averaging method. The similarity calculation unit 22 calculates similarities between a plurality of normal pixels and the defective pixel. The weight calculation unit 23 calculates weights of the plurality of normal pixels to the defective pixel based on the similarities between the plurality of normal pixels and the defective pixel. The correcting unit 24 normalizes the weights and adopts a weighted sum of values of the normal pixels according to the normalized weights as a corrected value of the defective pixel. Thus, different influences of the pixels in the neighborhood on correction of the defective pixel can be fully considered so that a normal pixel more similar to shooting information of the defective pixel has a greater weight. As such, the corrected pixel value of the defective pixel is better obtained such that it is closer to the original information, and the defective pixel is more accurately corrected.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method of correcting a defective pixel of a digital image, comprising:
  pre-correcting the defective pixel;
  calculating similarities between a plurality of normal pixels and the defective pixel;
  calculating weights of the plurality of normal pixels to the defective pixel based on the similarities between the plurality of normal pixel and the defective pixel; and
  normalizing the weights and adopting a weighted sum of values of the normal pixels according to the normalized weights as a corrected value of the defective pixel,
  wherein the calculating similarities between the plurality of normal pixels and the defective pixel comprises:
  calculating the similarities between the normal pixels and the defective pixel based on a neighborhood similarity by the following equation:

$$D(P_i, P_j) = \|U_R(P_i) - U_R(P_j)\|,$$

where Pi represents the defective pixel; Pj represents a normal pixel neighboring the defective pixel Pi; and D(Pi, Pj) is a distance representing a similarity between the pixels Pi and Pj, where the greater the distance is, the lower the similarity becomes, and the lower the weight becomes; $U_R(Pi)$ represents a neighborhood of the defective pixel Pi, which is a matrix having a size of 2R+1 centered on the defective pixel $P_i$; and $U_R(P_j)$ represents a neighborhood of the normal pixel $P_j$, which is a matrix having a size of 2R+1 centered on the normal pixel $P_j$.

2. A method of correcting a defective pixel of a digital image, comprising:
  pre-correcting the defective pixel;
  calculating similarities between a plurality of normal pixels and the defective pixel;
  calculating weights of the plurality of normal pixels to the defective pixel based on the similarities between the plurality of normal pixel and the defective pixel; and
  normalizing the weights and adopting a weighted sum of values of the normal pixels according to the normalized weights as a corrected value of the defective pixel,
  wherein the calculating weights of the plurality of normal pixels to the defective pixel based on the similarities between the plurality of normal pixels and the defective pixel comprises:
  calculating a weight $W_{i,j}$ of the normal pixel to the defective pixel by the following equation:

$$W_{i,j} = e^{-\frac{D^2(P_i, P_j)}{\sigma^2}}, \text{ or } W_{i,j} = -\frac{\sigma}{1 + D(P_i, P_j)}$$

wherein σ is a constant, and $D(P_i, P_j)$ represents the similarity of the normal pixel to the defective pixel.

3. A method of correcting a defective pixel of a digital image, comprising:
  pre-correcting the defective pixel;
  calculating similarities between a plurality of normal pixels and the defective pixel;
  calculating weights of the plurality of normal pixels to the defective pixel based on the similarities between the plurality of normal pixel and the defective pixel; and
  normalizing the weights and adopting a weighted sum of values of the normal pixels according to the normalized weights as a corrected value of the defective pixel,
  wherein the normalizing the weights and adopting a weighted sum of values of the normal pixels according to the normalized weights as a corrected value of the defective pixel comprises:
  calculating a corrected value $\hat{P}_i$ of the defective pixel by the following equation:

$$\hat{P}_i = \Sigma_j W^*_{i,j} P_j$$

where $$W^*_{i,j} = \frac{W_{i,j}}{\Sigma_j W_{i,j}},$$

$W^*_{i,j}$ represents a normalized weight, and $W_{i,j}$ represents a weight of the normal pixel $P_j$ to the defective pixel $P_i$.

4. A system of correcting a defective pixel of a digital image, comprising:
  a pre-correcting circuit configured to pre-correct the defective pixel;

a similarity calculation circuit in communication with the pre-correcting circuit and configured to calculate similarities between a plurality of normal pixels and the defective pixel;

a weight calculation circuit in communication with the similarity calculation circuit and configured to calculate weights of the plurality of normal pixels to the defective pixel based on the similarities between the plurality of normal pixels and the defective pixel; and a correcting circuit in communication with the weight calculation circuit and configured to normalize the weights and adopt a weighted sum of values of the normal pixels according to the normalized weights as a corrected value for the defective pixel, wherein the similarity calculation circuit is configured to calculate the similarities between the normal pixel and the defective pixel based on a neighborhood similarity by the following equation:

$$D(P_i, P_j) = \|U_R(P_i) - U_R(P_j)\|,$$

where $P_i$ represents the defective pixel; $P_j$ represents a normal pixel neighboring the defective pixel $P_i$; and $(P_i, P_j)$ is a distance representing a similarity between the pixels $P_i$ and $P_j$, where the greater the distance is, the lower the similarity becomes, and the lower the weight becomes; $U_R(P_i)$ represents a neighborhood of the defective pixel $P_i$, which is a matrix having a size of 2R+1 centered on the defective pixel $P_i$; and $U_R(P_j)$ represents a, neighborhood of the normal pixel $P_j$, which is a matrix having a size of 2R+1 centered on the normal pixel $P_j$.

5. A system of correcting a defective pixel of a digital image, comprising:

a pre-correcting circuit configured to pre-correct the defective pixel;

a similarity calculation circuit in communication with the pre-correcting circuit and configured to calculate similarities between a plurality of normal pixels and the defective pixel;

a weight calculation circuit in communication with the similarity calculation circuit and configured to calculate weights of the plurality of normal pixels to the defective pixel based on the similarities between the plurality of normal pixels and the defective pixel; and a correcting circuit in communication with the weight calculation circuit and configured to normalize the weights and adopt a weighted sum of values of the normal pixels according to the normalized weights as a corrected value for the defective pixel, wherein the weight calculation circuit is configured to calculate a weight $W_{i,j}$ of the normal pixel to the defective pixel by the following equation:

$$W_{i,j} = e^{-\frac{D^2(P_i, P_j)}{\sigma^2}}, \text{ or } W_{i,j} = -\frac{\sigma}{1 + D(P_i, P_j)}$$

wherein $\sigma$ is a constant, and $D(P_i, P_j)$ represents the similarity of the normal pixel to the defective pixel.

6. A system of correcting a defective pixel of a digital image, comprising:

a pre-correcting circuit configured to pre-correct the defective pixel;

a similarity calculation circuit in communication with the pre-correcting circuit and configured to calculate similarities between a plurality of normal pixels and the defective pixel;

a weight calculation circuit in communication with the similarity calculation circuit and configured to calculate weights of the plurality of normal pixels to the defective pixel based on the similarities between the plurality of normal pixels and the defective pixel; and a correcting circuit in communication with the weight calculation circuit and configured to normalize the weights and adopt a weighted sum of values of the normal pixels according to the normalized weights as a corrected value for the defective pixel, wherein the correcting circuit is configured to calculate a corrected value $\hat{P}_i$ of the defective pixel by the following equation:

$$\hat{P}_i = \Sigma_j W^*_{i,j} P_j$$

where $$W^*_{i,j} = \frac{W_{i,j}}{\Sigma_j W_{i,j}},$$

$W^*_{i,j}$ represents a normalized weight, and $W_{i,j}$ represents a weight of the normal pixel $P_j$ to the defective pixel $P_i$.

* * * * *